Figure 1:
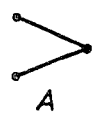
Figure 1:

United States Patent [19]

Bergvall

[11] 4,389,953
[45] Jun. 28, 1983

[54] SEWING MACHINE FOR SEWING FANCY SEAMS

[75] Inventor: Bengt A. Bergvall, Huskvarna, Sweden

[73] Assignee: Husqvarna, Huskvarna, Sweden

[21] Appl. No.: 227,043

[22] PCT Filed: Jun. 13, 1980

[86] PCT No.: PCT/SE80/00173
§ 371 Date: Dec. 24, 1980
§ 102(e) Date: Dec. 24, 1980

[87] PCT Pub. No.: WO80/02851
PCT Pub. Date: Dec. 24, 1980

[30] Foreign Application Priority Data
Jun. 20, 1979 [SE] Sweden ................................ 7905423

[51] Int. Cl.³ ............................................. D05B 3/02
[52] U.S. Cl. ................................................ 112/158 E
[58] Field of Search ............ 112/158 E, 121.12, 121.11

[56] References Cited

U.S. PATENT DOCUMENTS

| | | | |
|---|---|---|---|
| 4,122,786 | 10/1978 | Tanimoto et al. | 112/158 E |
| 4,200,048 | 4/1980 | Makabe et al. | 112/158 E |
| 4,275,674 | 6/1981 | Carbonato et al. | 112/158 E |
| 4,334,486 | 6/1982 | Toshiaki et al. | 112/158 E |

Primary Examiner—Peter P. Nerbun
Attorney, Agent, or Firm—Alfred E. Miller

[57] ABSTRACT

In a sewing machine with electronic pattern data circuits for the generation of signals used for sewing fancy seams, it is possible to save spacing in the data memory by dividing the fancy seams into seam elements of several stitches so that every seam is composed of a plurality of seam elements and one and the same seam element is part of several fancy seams. A sewing machine utilizing the seam element principle must have two different memories, one stitch memory storing every element stitch by stitch and one seam instruction list storing for each fancy seam the sequence of seam elements forming the selected seam.

10 Claims, 13 Drawing Figures

SEWING MACHINE FOR SEWING FANCY SEAMS

The present invention relates to a sewing machine with electronic pattern data circuits for the generation of signals which, converted into movements of the stitch-forming elements of the machine, are used for carrying out fancy seams.

Within the art of electronic pattern data circuits for sewing machines, several systems have been developed for the generation of control signals. Such a typical system may include a set of rather obvious units and be composed as follows: There is a memory unit, in which the patterns are stored so that every position of the needle in the transverse direction corresponds to a digital code word in the memory. Circuits of this kind must include an address counter in order to make the addressing of the successive needle positions run forwards, which counter is stepped by pulses in synchronism with the running of the machine. The address counter is supplied with the address (start address) of the selected pattern. Such a start address is carried out by an input selector, e.g. a set of change-over switches, and a logic circuit for supplying a digital input signal to an address memory and the like. The address counter then releases the code words for every one of the following stitches out of the memory. In addition to such typical systems there are embodiments of pattern data circuits in which computers are substituted for the memory unit for stitch data words and are capable of computing digital operations such as addition and multiplication, starting from given data, thereby successively generating code words for a determined fancy seam. Moreover, there are at least in theory combinations of systems with memory units and computers in which the memory unit can be used for certain types of fancy seams and the computer for other types.

However, the prior art systems have the disadvantage that the memory unit will be large, when the number of fancy seams is great. Assuming that a hypothetical sewing machine can sew 100 different fancy seams, everyone including 15 stitches on the average, and that the feeding movement demands digital stitch data of 5 bits and the zig-zag movement demands 4 bits, every stitch word in the prior art system thus takes $5+4=9$ bits. If every stitch word of each seam is stored separately, the hypothetical sewing machine needs a memory comprising $100 \times 15 \times 9 = 13500$ bits. Thereto a small amount of code for control of the addressing in the memory etc. is added. A memory with so many bits is large and expensive. It is therefore important to find solutions for reducing the number of bits without decreasing the capability of the machine.

A way to save memory spacing is offered by dividing the fancy seams into seam elements so that every fancy seam will consist of one or more seam elements. One and the same seam element is a part of several fancy seams whereby the memory spacing is minimized. Assuming for instance that two different seam elements A and B have an appearance according to the attached FIG. 1, i.a. the two zig-zag seams according to FIG. 2 can be composed by combination of the seam elements A and B.

A sewing machine having a seam element system for storing data needs two different memories: one memory for describing the appearance of every seam element stitch by stitch, herein called the stitch memory, and one memory describing for every fancy seam the sequence of seam elements forming the selected fancy seam. This memory is called a seam instruction list. The following exemplifying compilation will present an idea of what can be saved by the use of the seam element principle. The inventive idea is stated in claim 1.

A sewing machine with the 100 different fancy seams should, according to the seam element system, be able to sew these seams by means of e.g. 50 different seam elements, each one consisting of 5 stitches on the average. For identification of the seam elements 6 bits ($2^6 > 50$) are required. Every fancy seam comprises $15:5=3$ seam elements on the average.

The seam instruction list then needs $100 \times 3 \times 6 = 1800$ bits and the stitch memory needs $50 \times 5 \times 9 = 2250$ bits. In total, a memory spacing of 4050 bits is required, i.e. the compiled sewing machine can store its seams in less than one third of the memory spacing required in the embodiment of the conventional seam pattern storing known in the prior art.

It is also possible in a memory unit of the type concerned to compose arbitrary seam elements of varying appearance by several variations of the addressing. In the same way as one and the same stitch code word is a part of several seam elements, also one and the same seam element can be a part of several fancy seams, each one different from the other. Hereby a possibility is offered to compose arbitrary fancy seams of varying appearance by several variations of addressing in an address register. The possibility of composing new arbitrary fancy seams by the introduction of the seam element code into the system is essentially greater than is the case in a system with a memory unit storing the patterns one by one.

Figure 2:
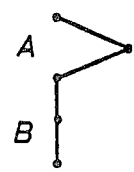
Figure 2:
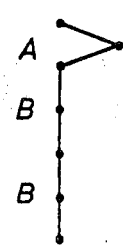
Figure 5:
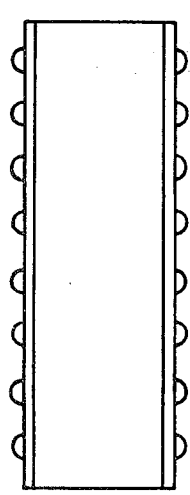
Figure 8:
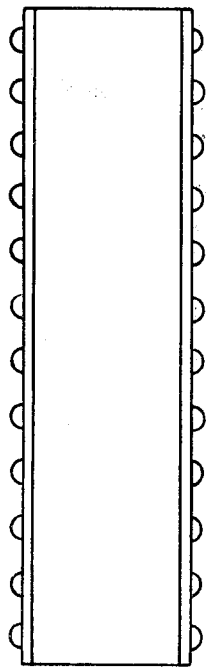
Figure 6:
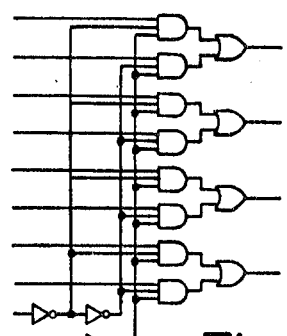
Figure 7:
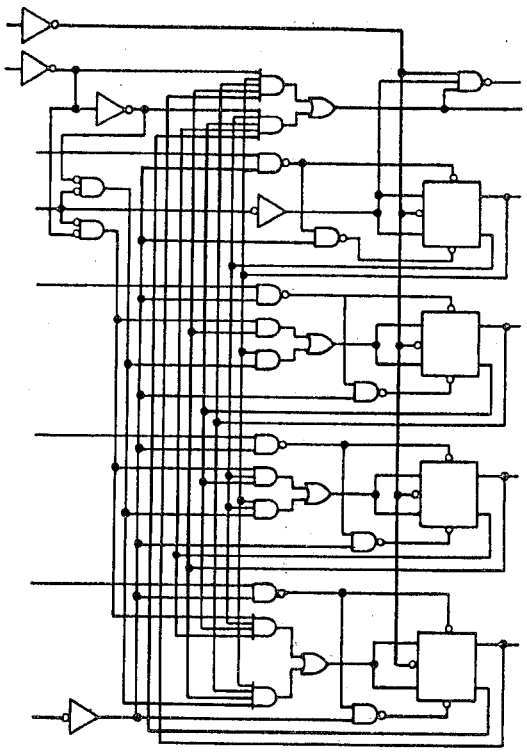
Figure 10:
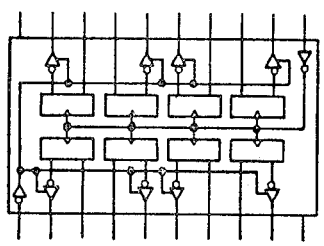
Figure 11:
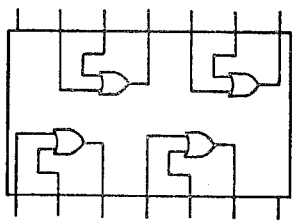
Figure 9:
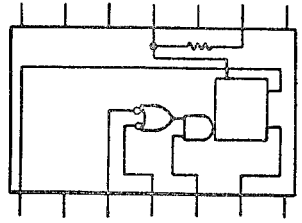
Figure 12:
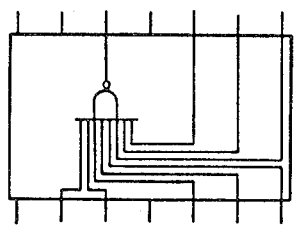
Figure 13:
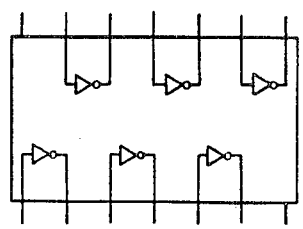

A sewing machine provided with electronic pattern data circuits with the said properties will be described in the following with reference to the accompanying drawings in which FIG. 1 an example of one seam element
FIG. 2 an example of another seam element
FIG. 3 a wiring diagram of the electronic system of the sewing machine
FIG. 4 a wiring diagram of an encoder
FIG. 5 a wiring diagram of a start-address memory
FIG. 6 a wiring diagram of an address selector
FIG. 7 a wiring diagram of an address counter
FIG. 8 a wiring diagram of a seam instruction list
FIG. 9 a wiring diagram of a mono stable flip-flop
FIG. 10 a wiring diagram of an address register
FIG. 11 a wiring diagram of a logic OR-gate
FIG. 12 a wiring diagram of NAND-gates
FIG. 13 a wiring diagram of an inverter.

Figure 3:
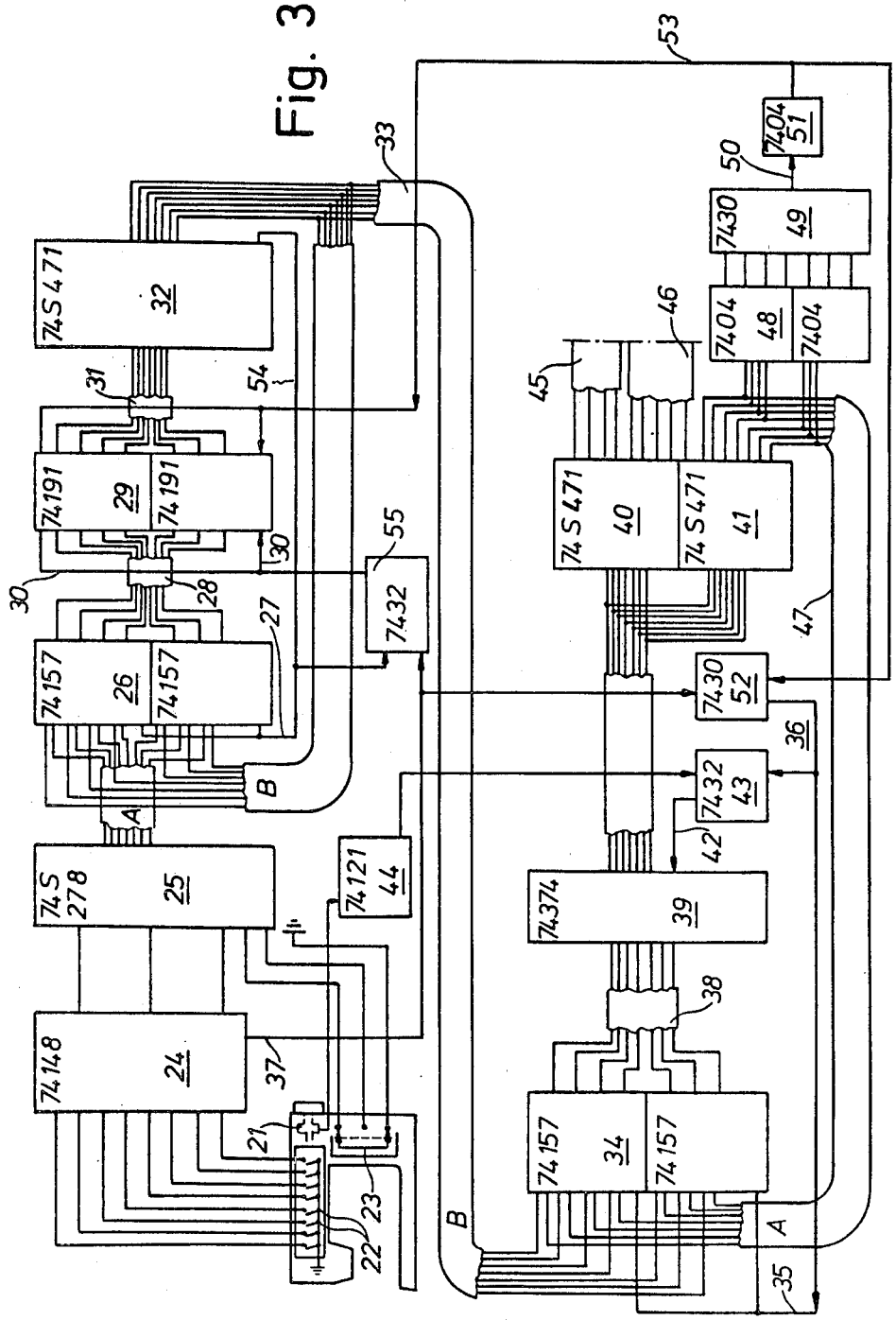
Figure 4:
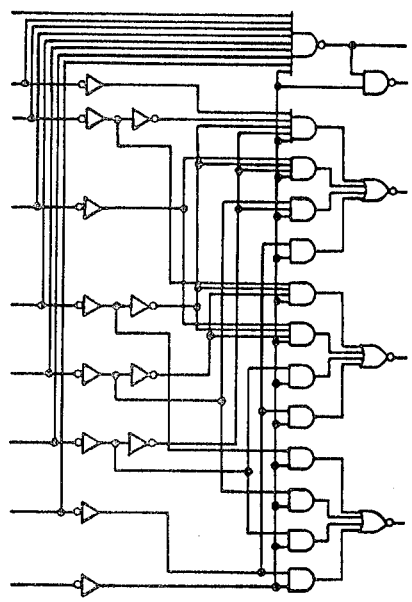

A detail diagram of the electronic system according to the invention is shown in FIG. 3, which schematically illustrates a sewing machine 20 with a pattern selection device. The pattern selection device includes 8 seam selector keys 22 and a pre-selector 23 in the form of a plug-in unit. The number of possible selections of seams will be 8 times the number of plug-in units, which in the example is selected to be 4, i.e. $8 \times 4 = 32$ selections. On the upper arm shaft of the machine there is a position indicator 21 which, by the use of electric pulses, indicates the angular position of the shaft during each revolution and applies these pulses to a gate. The functional units of the diagram are comprised of standard circuits of the TTL-type (transistor-transistor logic) and provided with type numbers which refer to the conventional numerical system of TTL-circuits. Each standard circuit with such a number is shown separately in the following Figures. The functional specification of each one of these standard circuits is as follows:

Circuit No. 74 148 (FIG. 4)—Encoder. It gives a unique 3-bit code to every one of the 8 inputs grounded. Moreover, it gives a signal on a separate output, when some of the inputs is grounded.

Circuit No. 74 S 278 (FIG. 5)—Read-only memory. 5-bit input makes 4×8=32 different addresses. Each address makes an 8-bits word on the output.

Circuit No. 74 157 (FIG. 6)—Address selector. It selects one of the input groups A and B and applies it to the output. If B is not selected, A is. Every 74 157 circuit can deal with 4 bits.

Circuit No. 74 191 (FIG. 7)—A 4-bit counter. It can be preadjusted to the desired 4-bits code.

Circuit No. 74 S 471 (FIG. 8)—Read-only memory 8 bits make 256 addresses. Each address gives an 8-bit word on the output.

Circuit No. 74 121 (FIG. 9)—Mono stable flip-flop. It produces an output pulse when the input is a logical "1".

Circuit No. 74 374 (FIG. 10)—An 8-bit register. When a gate signal goes positive the 8-bit data on the inputs are applied to the outputs of the register.

Circuit No. 7432 (FIG. 11)—A logic OR-gate.

Circuit No. 7430 (FIG. 12)—A logic 8bit NAND-gate.

Circuit No. 7404 (FIG. 13)—An inverter.

In the electronic system the functional units are interconnected, as shown in FIG. 3, and the system will then work in the following way. When the operator pushes a key 22 one of the inputs of the encoder 24 (FIG. 4) is grounded and a unique 3-bit code is fed to a start-address memory 25 (FIG. 5). This memory also has a 2-bit input from the pre-selector 23, which together with the unique 3-bit code forms a so-called seam selection code. This code releases an address word in the start-address memory, which is put on a wire group A (7 bits) to the A-inputs of an address selector 26 (FIG. 6). If no shift signal is present on the shift input 27 of the selector, the code on the A-input will pass the selector to the output and further via a wire group 28 to an address counter 29 (FIG. 7). This one is pre-settable so that the code on the group 28 in the presence of a signal on a trigger input 30 sets the counter on the digital number represented by the code. The address code goes further on a wire group 31 to a seam instruction list 32 (FIG. 8), in which the address word points out a memory cell storing the seam element code of the first seam element of the selected seam.

The seam element code is fed on a wire group 33 to the B-inputs of another address selector 34 (FIG. 6) provided with a shift input 35 activated by a selector circuit 36 (FIG. 12) controlled by an output 37 of the encoder 24. The selector then shifts the seam element code on a wire group 38 into an address register 39 (FIG. 10). This register acts as a latch which keeps the code and feeds it to a stitch memory 40 (FIG. 8) and a stitch address memory 41 (FIG. 8), in which the stitch code and the stitch addresses are stored. A trigger input 42 and associated control circuit 43, 44 (FIGS. 10, 12) give a signal for latching the code in the address register, which latching ceases when a pulse from the position indicator 21 changes over the control circuit. The element code is thus an address to a memory cell of the stitch memory and a similar cell of the stitch address memory. From the stitch memory a wire group 45 with 4 bits connects with a converter for setting zig-zag positions of the needle and a wire group 46 with 5 bits with a converter for moving the cloth feeder. The first stitch of a selected seam element is sewn when the memory cell with the code for the first needle penetration is pointed out by the said seam element code=stitch address, and the stitch code thereby is fed on the groups 45, 46. The seam element code also points out a memory cell in the stitch address memory storing the stitch address of the next stitch of the seam element. This address is fed on a wire group 47 to the A-inputs of the selector 34 whose shift input 35 is now broken by the selector circuit 36, whereby the code on the A-inputs is fed further to the address register 39, when the control circuit 43, 44 gives a trigging signal. The address code points out cells with the stitch codes in the memory 40 and another address in the memory 41, respectively, whereupon the next needle penetration follows.

All stitches of a seam element are sewn by means of the functional units 34, 39, 40 and 41. After the last stitch a code of only "0;s" is fed on the group 47 bifurcated to an end encoder 48 (FIG. 13), which code is inverted into "1"-code, which in a set of NAND-gates 49 (FIG. 12) releases an output signal on a wire 50 to an input of another inverter 51 (FIG. 13). The output signal of this one is fed to an input of another NAND-gate 52 connected to the selector circuit 36. Coinciding input signals on this gate activate the shift input 35, whereupon the inputs B of the selector 34 are prepared for receiving another seam element code. The output signal is also fed on another wire 53 to the counting circuit of the counter 29 (FIG. 7). A logic "1" is added to the digital number which was pre-set on the counter. The new address code which is then fed on the group 31 constitutes the sum of the prior code and "1". This address code points out another cell in the seam element list storing a code to be fed on the inputs B in the address selector 34. Then another stitch address is present on the group 38 pointing out cells in the stitch and stitch address memories 40, 41. The contents of these cells form the code of the first stitch of the second seam element of a selected seam and also the address of the next stitch of this seam element. Thereafter, all stitches of this second seam element are sewn by means of the functional units 34, 39, 40, 41, just as in the case of the fist seam element. The end of the seam element is indicated by an end code on the group 47, as hereinbefore described.

In an analogous way to the indication of the end of a seam element, an end instruction of a finished set of seam elements is indicated when the last seam element is sewn, by way of a logical "1" on an output wire 54 of the seam element list. The other outputs give simultaneously an address code to the address selector, input B, which is shifted in by the wire 54. This one has a branch to an OR-gate 55 by means of which a pre-setting signal to the counter 29 is fed, so that this one is adjusted to the number received on the B-input. This arrangement may thus bring the counter "jump" from one number to another. After such a "jump" the counter steps again one step forwards after each seam element.

I claim:

1. In a sewing machine for sewing fancy seams and including mechanisms for mechanically positioning the needle and/or a cloth feeder of the machine for every stitch and a memory unit controlling said mechanisms, wherein stitch code words representing at least one specific fancy seam are selected from said unit by means of a pattern selector and said code words are applied to the mechanism in synchronism with a pulse generator driven by the mechanical drive system of the machine, the improvememt wherein said memory unit comprises a stitch memory for storing stitch codes for groups of stitches which comprise seam elements, each said group including at least one stitch, said fancy seam comprising predetermined combinations of said seam elements, and comprising a seam instruction list for storing the seam instruction code of the predetermined combination of seam elements of the fancy seams and connected to successively apply start words for each of the seam elements to said stitch memory.

2. A sewing machine according to claim 1, wherein a counter is coupled to the seam instruction list and preadjustable to an arbitrary number by the pattern selector and is connected to be forced to step when at least one seam element is finished, and to bring forward another instruction code in the list in the said predetermined composition and to jump back after a sequence or set of finished seam elements in dependence upon a set and decoder for detecting a predetermined end cord and adjusting the counter to a number determined by the seam instruction list.

3. A sewing machine according to claim 2, wherein the set end decoder is coupled to an address selector connected to adjust the counter to a number separated from the originally adjusted arbitrary number.

4. A sewing machine according to claim 1, wherein an instruction address register is coupled to the seam instruction list and, in dependence of the pattern selector pointing out addresses in the list, and that an instruction address memory is coupled to the address register and pointing out another address in the list in dependence of the preceding supplied address after at least one finished seam element.

5. A sewing machine according to claim 4 wherein the addresses in the address memory representing the said set of seam elements constitute a closed chain in the address memory so that a preceding address in the chain is supplied after a plurality of output addresses in order to repeat the set of seam elements.

6. A sewing machine according to claim 5, wherein said preceding address in the closed chain is the address positioned second or later in the chain.

7. A sewing machine according to claim 2 or claim 3, wherein a seam element and decoder is associated with the stitch memory and detects a predetermined end code when any seam element is finished, and supplies a counting pulse to the counter bringing ahead the next seam element code in the seam instruction list.

8. A sewing machine according to claim 1, wherein the address inputs of the stitch memory are prepared with a start address before the sewing of a seam element, in dependence of the code from the seam instruction list.

9. A sewing machine according to claim 1, wherein the stitch memory is provided with a stitch address memory supplied with the same address codes as the stitch memory and supplying address code on its output representing the following stitch.

10. A sewing machine according to claim 9, wherein the stitch memory is associated with an address register, which is prepared with a start address word from the seam instruction list before the sewing of a seam element and forwards the word to the stitch memory and its address memory in dependence on the pulse generator.

* * * * *